July 26, 1938.  J. P. DILLON  2,125,154
WINDSHIELD HEATER FOR VEHICLES
Filed Nov. 11, 1936  2 Sheets-Sheet 1
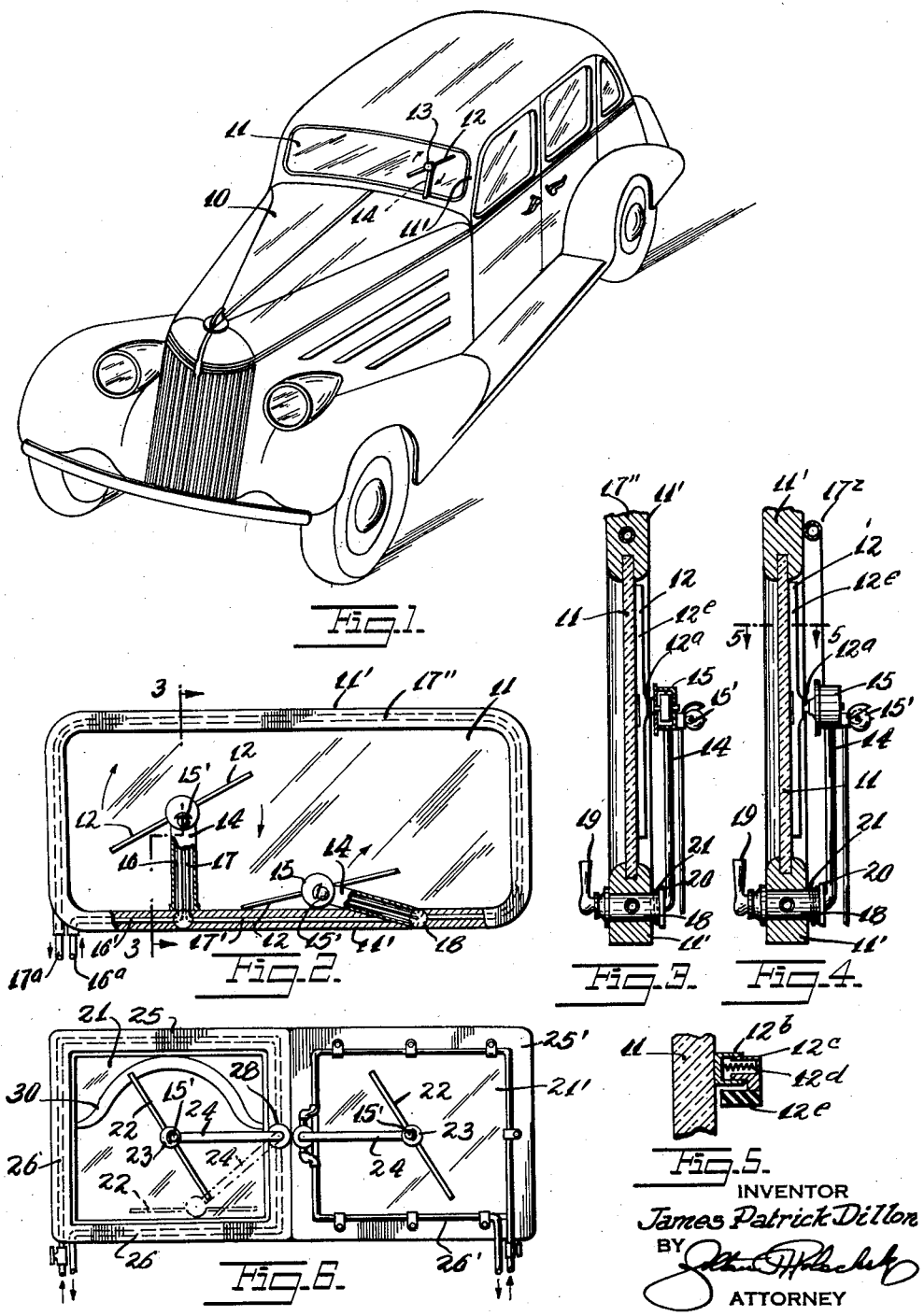
INVENTOR
James Patrick Dillon
BY
ATTORNEY July 26, 1938.  J. P. DILLON  2,125,154
WINDSHIELD HEATER FOR VEHICLES
Filed Nov. 11, 1936  2 Sheets-Sheet 2
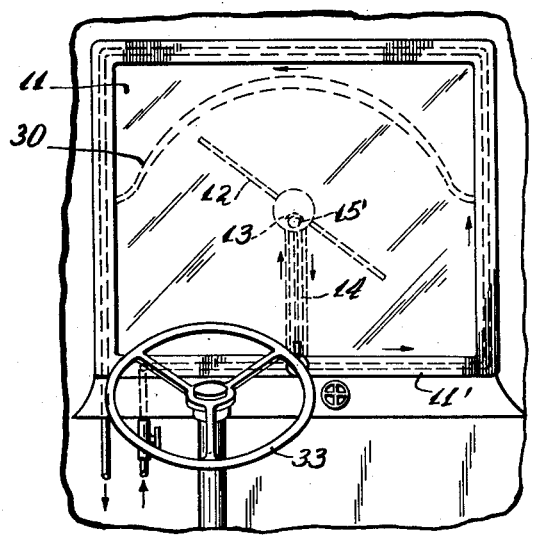
Fig. 7.
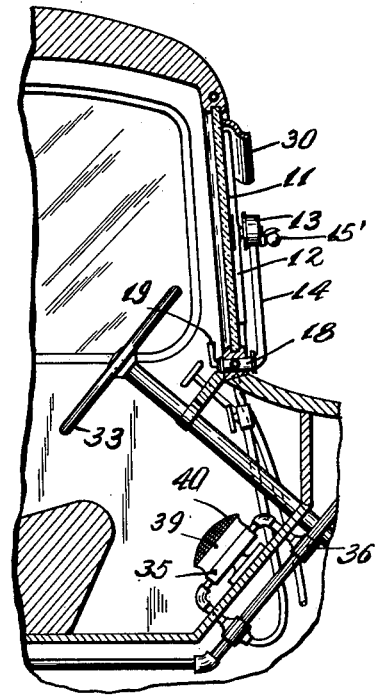
Fig. 8.
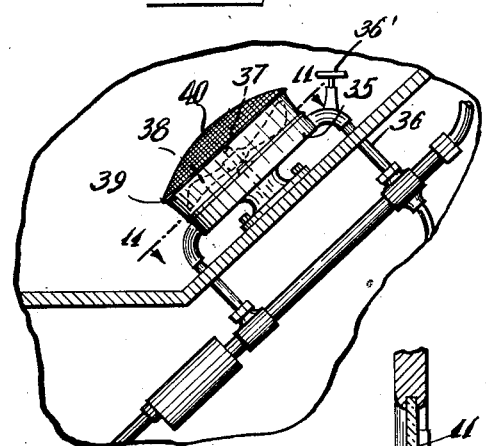
Fig. 10.
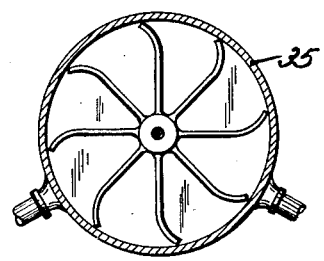
Fig. 11.
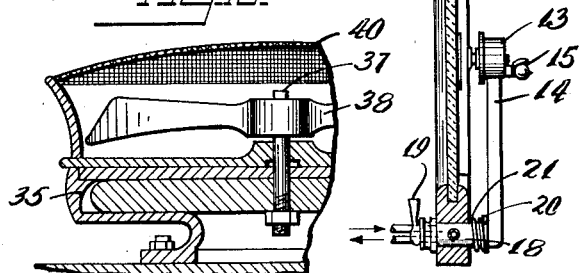
Fig. 12.  Fig. 9.
INVENTOR
James Patrick Dillon
BY
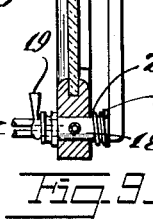
ATTORNEY Patented July 26, 1938

2,125,154

UNITED STATES PATENT OFFICE 2,125,154

WINDSHIELD HEATER FOR VEHICLES

James Patrick Dillon, New York, N. Y., assignor of one-third to Hannah Fuller, New York, N. Y.

Application November 11, 1936, Serial No. 110,251

1 Claim. (Cl. 15—250)

This invention relates to new and useful improvements in a windshield heater.

The invention has for an object the construction of a heater capable of heating a windshield for the purpose of keeping it clear of ice, snow and vapors.

The invention particularly proposes the construction of a windshield heater which is characterized by the provision of a squeegee element of the like operating against the outer surface of a windshield and used in combination with a heated substance, preferably the exhaust from the vehicle, having said windshield, to keep the windshield clear.

A further object of this invention is to provide a motor in combination with the squeegee or other windshield wiper which is operated by the heated substance such as the exhaust gases, which heated substance is also simultaneously used to heat the windshield to keep it clear from ice and snow.

Another object of this invention is to provide pipes for the passage of the heated fluid, which pipes preferably extend around the windshield, either embedded into the frame which holds the windshield, or outside of the frame, or around the edges of the windshield itself.

Still further the invention contemplates the association of a heater with the circulating heated substance so that this heated substance may also operate the heater in addition to performing its other duties.

Another one of the objects of this invention is to provide a handle upon or near the inside face of the windshield which may be manually operated for placing the windshield wiper into an operative position or into a retracted inoperative position out of prominent view across the windshield.

Still further the invention proposes an arrangement which will permit the handle to be manually pulled inwards in addition to being rotated to press the windshield wiper harder against the windshield which may be necessary during very heavy storms to keep the windshield clear.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:—

Fig. 1 is a perspective view of an automobile with a windshield provided with a windshield heater constructed according to this invention.

Fig. 2 is a schematic outside elevational view of the windshield with the heater applied; this view is called schematic because certain of the parts have been projected out of their actual plane so that the complete circuit of the pipe system may be easily traced.

Fig. 3 is a vertical sectional view taken on the line 3—3 of Fig. 2.

Fig. 4 is a view similar to Fig. 3 but showing some of the parts in elevation, and furthermore showing the pipes located outside of the windshield frame.

Fig. 5 is a fragmentary transverse sectional view taken on the line 5—5 of Fig. 4.

Fig. 6 is an outside elevational view of a windshield with two different types of windshield heaters constructed according to this invention, applied thereon. These different types are arranged side by side, each taking up one-half the width of the windshield.

Fig. 7 is a fragmentary elevational view of a windshield seen from the interior of a car and constructed according to this invention.

Fig. 8 is a sectional view of Fig. 7.

Fig. 9 is a sectional view of a windshield associated with a windshield heater according to another form of the invention.

Fig. 10 is a side elevational view of a heater for the automobile operated by the same substance which operates the windshield heater.

Fig. 11 is a transverse sectional view of the turbine used in the heater shown in Fig. 10, this view being as though taken on the line 11—11 of Fig. 10.

Fig. 12 is a fragmentary sectional view of a portion of Fig. 10.

In Fig. 1 a standard automobile 10 has been illustrated which is provided with a windshield 11 to which a windshield heater according to this invention has been applied. This windshield heater includes an external rotative squeegee or similar element 12 which is operated by a motor 13 mounted upon the extremity of an arm 14 pivotally supported on the window frame 11' of the windshield 11. The details of the parts are shown in Figs. 2 and 7.

The squeegee or similar element 12 is provided with a central hub portion 12ª connected with a turbine or motor 15 mounted upon the end of the arm 14. This arm 14 is provided with a pair of passages 16 and 17, one for the supply of the operating fluid of the motor and the other for the exhaust of this fluid. The arm 14 extends downwards and is rigidly connected with a valve element 18. This valve element is adapted to rotate, or in any other manner is pivoted in the windshield frame 11'. Its inner end is provided with a handle 19 by which it may be turned. The passages 16 and 17, in one position of the valve align with passages 16' and 17' comprising pipes built into the frame 11'. The outer end of the valve 18 is provided with a collar 20. An expansion spring acts between this collar and the side of the frame 11' for urging the valve 18 outwards. In this position of the valve the squeegee element 12 presses against the window pane at a pre-determined pressure. This pressure may be increased by manually drawing the handle 19 inwards so as to compress the spring 21.

The turbine or motor 15 may be enclosed in a transparent housing to permit viewing of the rotor 15. The rotation of this member may serve to indicate that the gases pass out of the devices.

An electric signal or high dim light 15' may also be mounted on the casing of the turbine 15. This light is connected to the battery of the vehicle and may be connected into an electric circuit by a suitable switch at the driver's seat, so that it may be used as a turn indicator or to attract the attention of other drivers or pedestrians, either at the front windshield or at the rear window of the vehicle.

The pipe 16' is connected with a supply pipe 16ª which is intended to be connected to receive some of the exhaust gases from the automobile or to receive other heated and moving fluid or substances. From this pipe the substances pass through the pipe line 16 and then through the motor 15 to revolve the squeegee element 12. The substance then exhausts through the pipe 17 and passes along the pipe 17'. A second squeegee device is then connected in series in the pipe 17'. This second device is identical to the first device, and in Fig. 2 is shown in their lowered inoperative position. When in this position the valve 18 does not permit the passage of the gases. It is necessary that both of the squeegee devices be in their vertical positions, then the circuit is complete. The gases may then pass through the second squeegee device along the pipe line 17' embedded within the frame 11' and extending around the windshield 11 and finally discharging into the pipe 17ª which exhausts to atmosphere at a suitable location upon the automobile.

The squeegee element 12 consists of a pair of radial arms each comprising a pair of inter-engaging elements 12ᵇ and 12ᶜ urged into a neutral extended position by an internal spring 12ᵈ. A rubber squeegee element 12ᵉ is attached to the outer frame 12ᶜ and normally does not contact with the surface of the windshield 11. When the handle 19 is pulled inwards the springs 12 are compressed and the rubber squeegee 12ᵉ engages the face of the windshield and supplements the cleansing action of the element 12ᵇ. The purpose of having the metallic element normally engaging the windshield is that it then permits the conduction of heat from the motor 15. Thus the heated metal part will assist in clearing the windshield of ice and snow. The rubber part 12ᵉ is only used for better wiping the melted substances from the windshield if this is desired.

In Fig. 4 a modified construction of the invention has been disclosed which distinguishes from the prior form merely in the fact that the pipes which convey the heated fluid or substance are arranged along the outer sides of the frame 11'. These pipes are generally indicated on the drawings by reference numerals 17ˣ. The difference between this form and the prior form is merely one of degree. In the prior form the conduction of the parts in contact with the heated pipes are depended upon to carry the heat to the windshield. In the form of the invention shown in Fig. 4 radiation through the air is mainly depended upon.

In Fig. 6 a modified form of the invention has been disclosed which distinguishes from the prior forms primarily in the arrangement of the parts. According to this form of the invention there is a windshield 21 against which a squeegee or similar cleaning element 22 operates which is driven by a motor 23 at its center. This motor is mounted on a pivotally mounted arm 24 connected with a rotative bushing or valve 28 controlled in a manner similar to the valve 18 previously described. The windshield 21 is provided with a frame 25 through the pipes 26 for conveying the heated fluid which operates the motor 23.

Fig. 6 shows another portion of the windshield, indicated by reference numeral 21', provided with a duplicate cleaning device consisting of the squeegee or similar element 22, the motor 23, the arm 24 and the pipes 26'. These pipes are arranged external of the frame 25' of the windshield.

A protective shield 30 is extended across the windshield 21 above the squeegee or similar element 22 and extends from end to end of the windshield and drains off ice and snow. This element is curved transversely as well as laterally as may be clearly seen from an inspection of Figs. 6, 7 and 8.

Fig. 7 is an enlarged detailed inside view of the windshield and mechanism shown in Fig. 6. For this reason the steering wheel 33 of the automobile is also visible.

In Figs. 8–12 inclusive a car heater has been shown associated with the windshield heater. This car heater comprises, essentially, a turbine or other motor portion 35 operated by heated fluid or similar substances passing through the pipes 36. This heater may be shut off by a valve 36' arranged in the pipe system 36. From the turbine portion 35 a shaft 37 projects and carries a fan or blade 28 which is housed within a casing 39 covered by a screen 40. The details of the turbine form no part of the invention and therefore will not be given in this specification. The turbine, as shown, is of the fluid impinging type. In other respects this form of the invention is similar to the prior forms and similar parts may be recognized by the same reference numerals.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:—

In combination with a windshield consisting of a pane of glass supported in a frame, a pipe line for fluid substance extending longitudinally through said frame, a cylindrical valve element rotatively extending transversely through said frame and pipe line and having a passage which connects the pipe line sections in one turned position, a handle on the inner end of said valve element for turning same, and a hollow arm for supporting a window cleaning element which is operable by said fluid substance, said arm being mounted on the outer end of said valve element and connecting with said passage and having a portion for supporting said cleaning element extending parallel to said pane, whereby said valve element may be turned to move said arm to cut off passage of said fluid substance and to simultaneously assume a different position.

JAMES P. DILLON.